(12) United States Patent
Mathew

(10) Patent No.: US 7,029,058 B2
(45) Date of Patent: Apr. 18, 2006

(54) INTEGRATED AUTOMOTIVE ROOF AND AIR FIN

(75) Inventor: Boney A. Mathew, Clarkston, MI (US)

(73) Assignee: Mathson Industries, Troy, MI (US)

( * ) Notice: Subject to any disclaimer, the term of this patent is extended or adjusted under 35 U.S.C. 154(b) by 0 days.

(21) Appl. No.: 11/226,114

(22) Filed: Sep. 14, 2005

(65) Prior Publication Data

US 2006/0055204 A1  Mar. 16, 2006

Related U.S. Application Data

(60) Provisional application No. 60/609,905, filed on Sep. 14, 2004.

(51) Int. Cl.
*B60J 1/00* (2006.01)

(52) U.S. Cl. .................................... 296/180.1

(58) Field of Classification Search ............. 296/180.1, 296/180.2, 180.4
See application file for complete search history.

(56) References Cited

U.S. PATENT DOCUMENTS

| | | |
|---|---|---|
| 3,799,603 A | 3/1974 | Bott |
| 4,081,195 A | 3/1978 | Gotz |
| 4,159,843 A | 7/1979 | Crossman |
| 4,174,863 A | 11/1979 | Gotz |
| 4,355,834 A | 10/1982 | Alford |
| 4,357,045 A * | 11/1982 | Kinford, Jr. ............. 296/180.2 |
| 4,441,752 A * | 4/1984 | Buehrig ................... 296/180.1 |
| 4,883,307 A * | 11/1989 | Hacker et al. ........... 296/180.2 |
| 5,056,851 A | 10/1991 | Horwill et al. |
| 5,172,954 A * | 12/1992 | Yamazaki et al. ........ 296/180.1 |
| 5,240,536 A * | 8/1993 | Kurobe ....................... 156/228 |
| 5,249,836 A | 10/1993 | Stanesic et al. |
| 6,168,231 B1 | 1/2001 | Fielding et al. |
| 6,193,302 B1 | 2/2001 | Won et al. |
| 6,299,244 B1 | 10/2001 | Tarahomi |
| 6,378,936 B1 | 4/2002 | Grimm et al. |
| 6,457,768 B1 | 10/2002 | Schroeder et al. |
| 6,470,573 B1 | 10/2002 | Tarahomi |
| 6,575,521 B1 | 6/2003 | Tarahomi |
| 6,592,177 B1 | 7/2003 | Mathew |
| 6,637,806 B1 * | 10/2003 | Kazama ................... 296/180.1 |
| 6,702,369 B1 | 3/2004 | Mathew et al. |
| 2003/0038507 A1 * | 2/2003 | Kasahara ................. 296/180.1 |

* cited by examiner

Primary Examiner—Lori L. Coletta
(74) Attorney, Agent, or Firm—Howard & Howard

(57) ABSTRACT

A cantilevered fin (34) or spoiler includes an upper shell (36) and a lower shell (38) Each shell (36, 38) extends from the cover (32) of the roof to engaging distal edges (40). The cover (32) includes a frame (42) and a sheet (44) supported by the frame (42).

11 Claims, 3 Drawing Sheets

INTEGRATED AUTOMOTIVE ROOF AND AIR FIN

CROSS REFERENCE TO RELATED APPLICATION

This application claims the benefit of provisional application Ser. No. 60/609,905 filed Sep. 14, 2004.

BACKGROUND OF THE INVENTION

1. Field of the Invention

A vehicle body and, more specifically, a cantilevered fin or spoiler extending from the roof or trunk lid of such a vehicle.

2. Description of the Prior Art

A typical vehicle body includes a bottom, side panels and a rear panel extending upwardly from the bottom with door openings and window openings defined in the vehicle body. The vehicle body presents an upwardly facing cover supported by the panels in the form of a roof or a trunk lid. Frequently, a cantilevered fin or spoiler extends rearwardly in a cantilevered fashion from that cover.

SUMMARY OF THE INVENTION AND ADVANTAGES

The invention provides a cantilevered fin including an upper shell and a lower shell each extending from the cover to a distal edge and in engagement with one another at the distal edge.

The invention provides a consolidation of the plastic cover of the roof and the spoiler, which may house accessories such as antennas and lights. The components may combine class A roof material and structural roof material into one composite roof module using material such as PET, CBT, PAA, SMC, polymer blends such as PC/PPE, PA/PPO etc. or combinations thereof with or without reinforcement like glass fibers, carbon fibers, aramide fibers, minerals, etc., or combinations thereof. The combination allows painting options of online, inline or offline.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
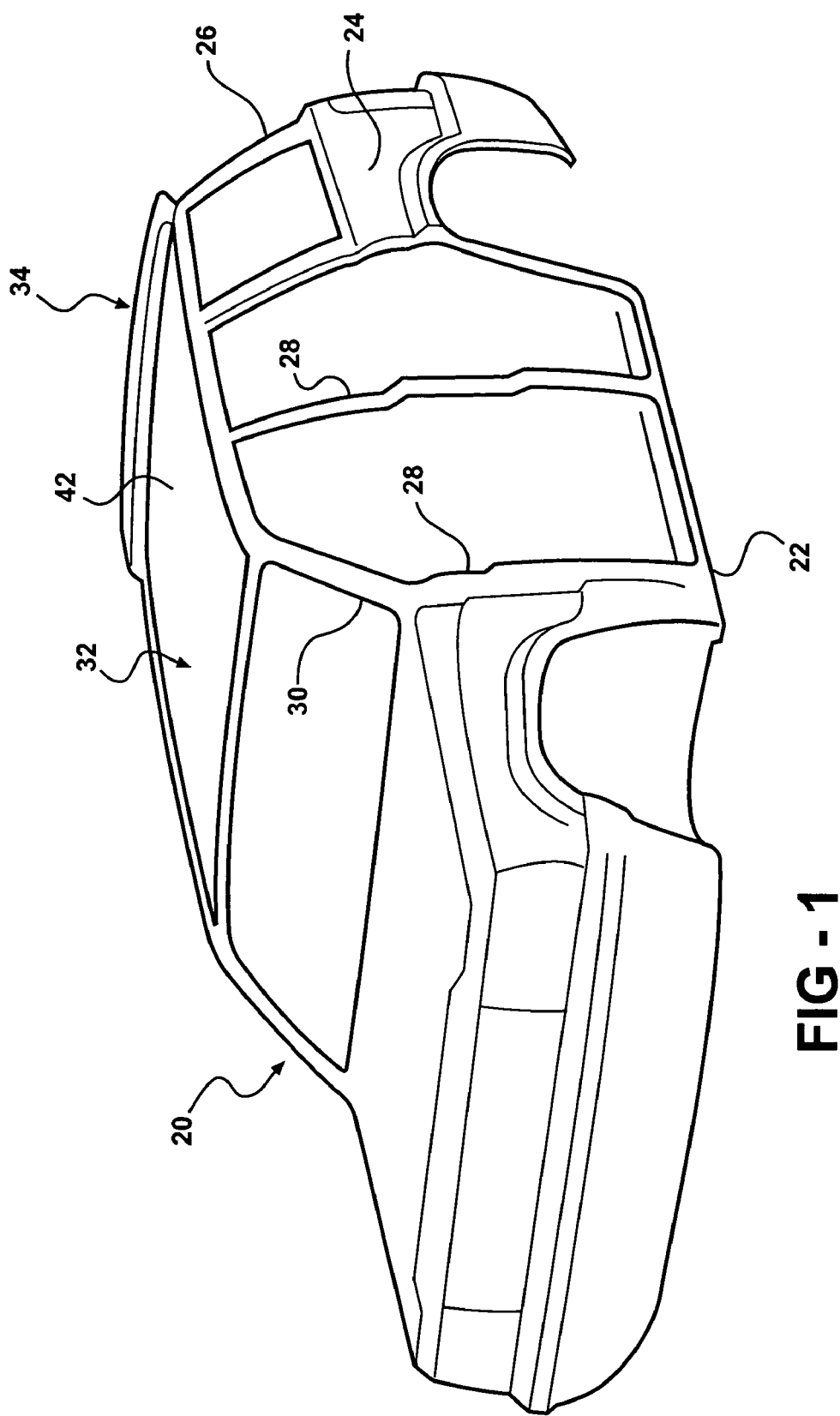
FIG. 1 is a perspective view of a vehicle body.

Referring to the Figures, wherein like numerals indicate corresponding parts throughout the several views, a vehicle body 20 is generally shown in FIG. 1. The vehicle body 20 includes a bottom 22, side panels 24 and a rear panel 26 extending upwardly from the bottom 22. As is well known, the vehicle body 20 defines door openings 28 and window openings 30. The panels 24, 26 support an upwardly facing cover 32 shown generally, which may be the roof, or roof panel, as illustrated, or a rear trunk lid. In all such embodiments, the cover 32 is a substantially horizontal surface.

A cantilevered fin 34 generally shown extends rearwardly in a cantilevered fashion from the cover 32. Such a cantilevered fin 34 is often referred to as a spoiler or aerodynamic fin.

The cantilevered fin 34 is distinguished by including an upper shell 36 and a lower shell 38 each extending from the cover 32 to a distal edge 40 and in engagement with one another at the distal edge 40.

The cover 32 includes a frame 42 and a sheet 44 supported by the frame 42. Both the sheet 44 and the frame 42 are preferably of a plastic organic polymeric material wherein the sheet 44 of the cover 32 presents a class A surface, unpainted or painted. The upper shell 36 of the cantilevered fin 34 includes an upper surface and the lower shell 38 of the cantilevered fin 34 includes a lower surface with both surfaces of the shells 36, 38 being class A finish surfaces.

Figure 2:
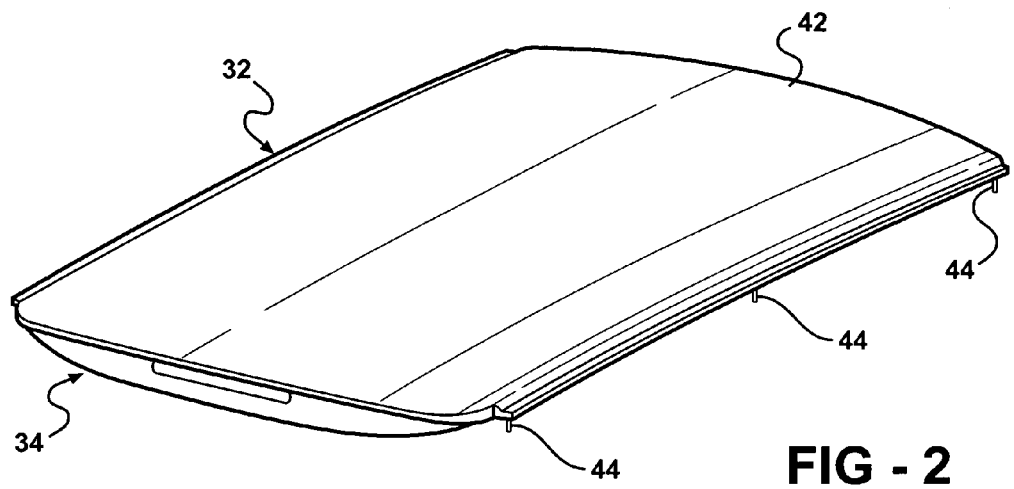
FIG. 2 is a perspective view form the top of a cover for the roof of a vehicle body with a cantilevered fin.
Figure 3:
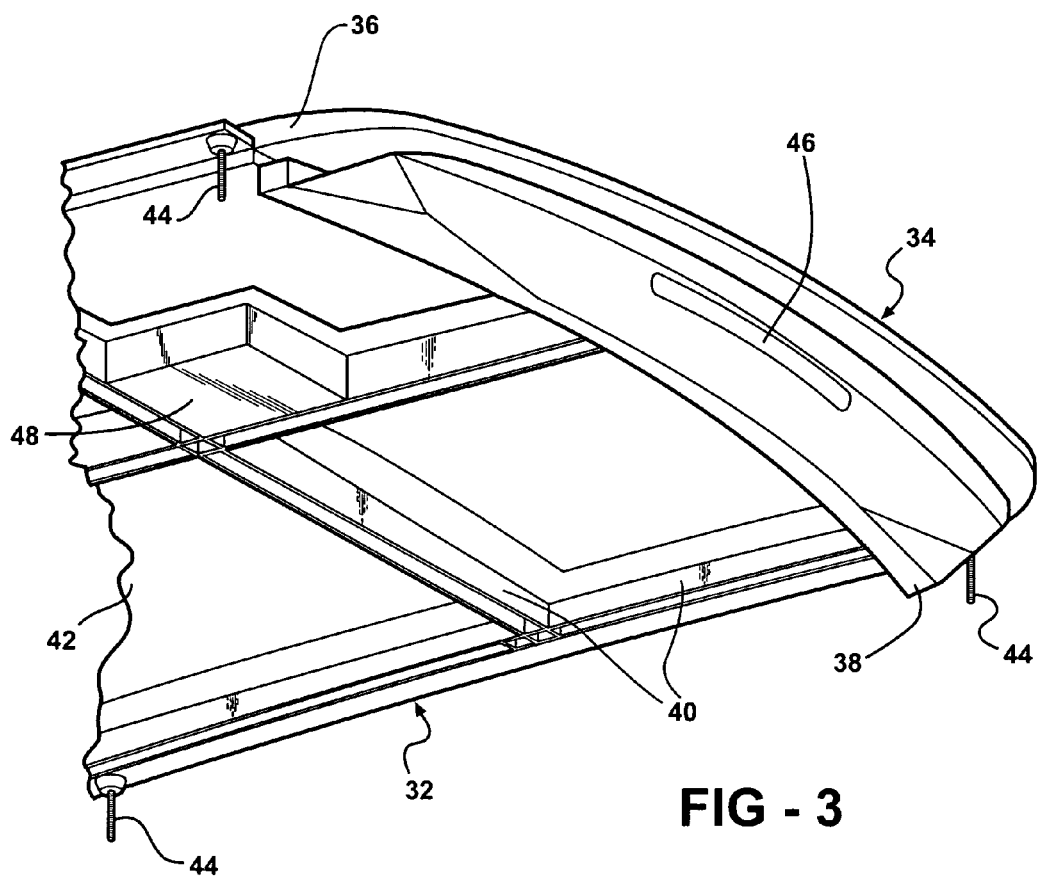
FIG. 3 is a partial perspective view of the underside of a cover for the roof of a vehicle body with a cantilevered fin and showing the frame and sheet of the cover.
Figure 4:
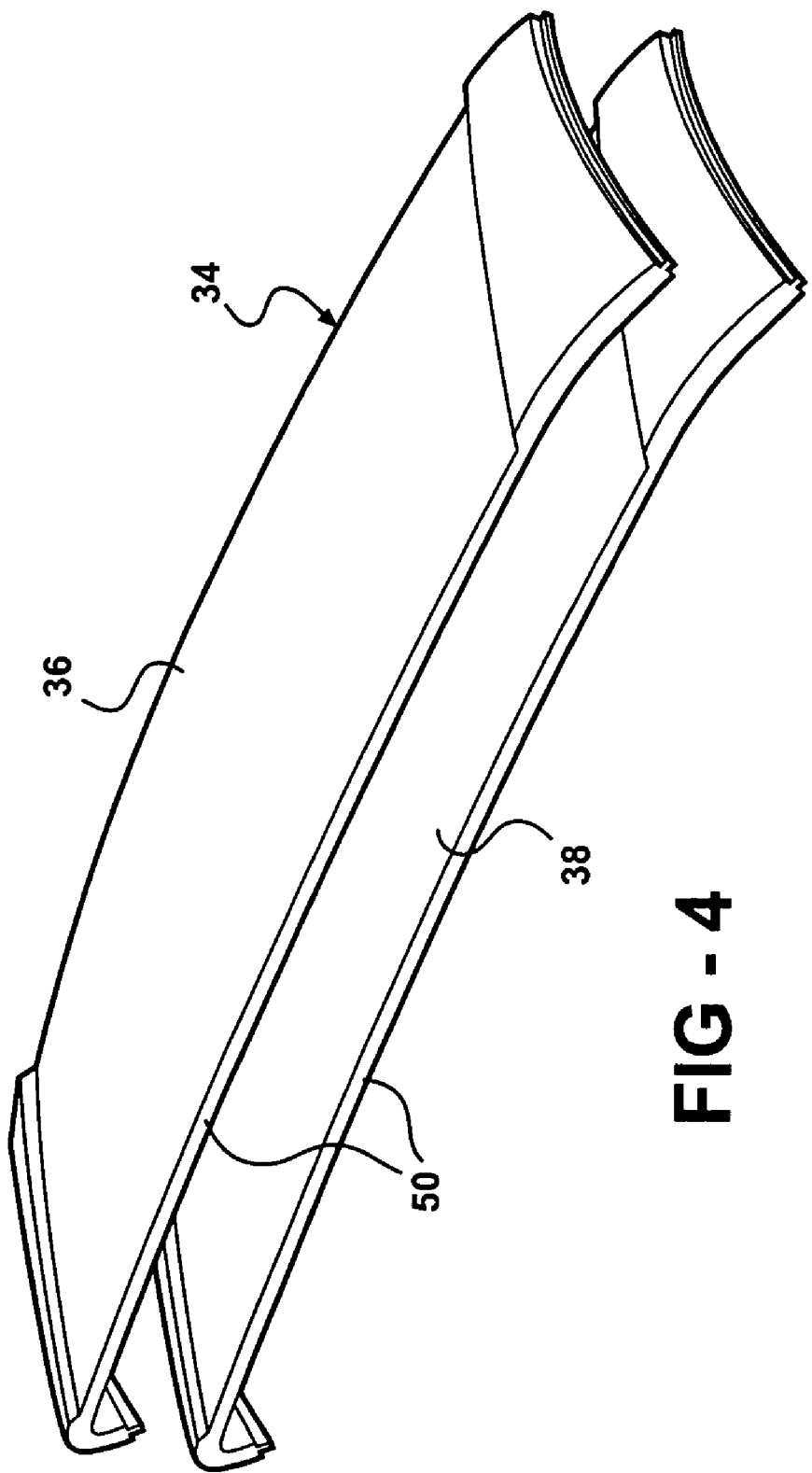
FIG. 4 is perspective view of the upper and lower shells of a cantilevered fin of the subject invention.

Although the upper surface of the upper shell 36 of the cantilevered fin 34 may be integral with and a homogenous continuation of the upper class A surface of the cover 32 as shown in FIG. 2, e.g., molded as one integral component, in the embodiment illustrated in FIGS. 3 and 4, both of the upper and lower shells 36, 38 are independent components. The shells 36, 38 present open edges 40 opposite to the distal edge 40 to define a periphery engaging the cover 32 to close the shells 36, 38 to the cover 32. The open edges 40 may be spaced from one another to present a space between the shells 36, 38.

In the preferred embodiment, the cover 32 and the shells 36, 38 consist of an organic polymeric or plastic material. The lower shell 38 of the cantilevered fin 34 is attached to and extends from the frame 42 and the upper shell 36 of the cantilevered fin 34 is attached to and extends from the frame 42. The attachment of the shells 36, 38 to the frame 42 may be by fasteners 46 associated with bosses molded into the shells 36, 38. The frame 42 may comprise a metal and the shells may be either plastic or metal, but in the preferred embodiment at least the cover 32 and the upper shell 36 are plastic, e.g., a mineral reinforced plastic. Other material such as metal, ceramic and glass can be used.

The cover 32 in the embodiment illustrated comprises an insert that is fastened in an aperture in the roof of the vehicle body 20. The insert includes fasteners 46 to attach the insert to the roof but the insert could be welded, fused or adhesively secured to the surrounding roof. One of the shells 36, 38, preferably the lower shell 38, comprises an organic polymeric material including a strengthening material, such as glass fibers, carbon fibers, aramide fibers, mineral, etc. or combinations thereof.

Accessories may be disposed between the upper and lower shells 36, 38 like the rear light 48 disposed in the lower shell 38. An accessory box 50 may also be disposed in or supported by the frame 42 from which electrical wires may be stung. The frame 42 is normally hidden by a headliner (not shown) of the type well known in the automotive industry.

Obviously, many modifications and variations of the present invention are possible in light of the above teachings. The invention may be practiced otherwise than as specifically described within the scope of the appended claims, wherein that which is prior art is antecedent to the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover 32 any combination in which the incentive novelty exercises its utility. In addition, the reference numerals in the claims are merely for convenience and are not to be read in any way as limiting.

What is claimed is:

1. A vehicle body (20) comprising;
a bottom (22), side panels (24) and a rear panel (26) extending upwardly from said bottom (22) and defining door openings (28) and window openings (30), an upwardly facing cover (32) supported by said panels (24, 26), a cantilevered fin (34) extending rearwardly in a cantilevered fashion from said cover (32), and characterized by said cantilevered fin (34) including an upper shell (36) and a lower shell (38) each extending from said cover (32) to a distal edge (40) and in engagement with one another at said distal edge (40).

2. A vehicle body (20) as set forth in claim 1 wherein said cover (32) includes a frame (42) and a sheet (44) supported by said frame (42).

3. A vehicle body (20) as set forth in claim 2 wherein said lower shell (38) of said cantilevered fin (34) extends from said frame (42).

4. A vehicle body (20) as set forth in claim 3 wherein said upper shell (36) of said cantilevered fin (34) extends from said frame (42).

5. A vehicle body (20) as set forth in claim 3 wherein said cover (32) presents a class A surface.

6. A vehicle body (20) as set forth in claim 5 wherein said upper shell (36) of said cantilevered fin (34) includes an upper surface and said lower shell (38) of said cantilevered fin (34) includes a lower surface with both surfaces of said shells (36, 38) being class A finish surfaces.

7. A vehicle body (20) as set forth in claim 3 wherein said upper surface of said upper shell (36) of said cantilevered fin (34) is integral with and a homogenous continuation of said upper class A surface of said cover (32).

8. A vehicle body (20) as set forth in claim 3 wherein said cover (32) and said cantilevered fin (34) include at least one organic polymeric material.

9. A vehicle body (20) as set forth in claim 1 including accessories disposed between said upper and lower shells (36, 38).

10. A vehicle body (20) as set forth in claim 1 wherein one of said shells (36, 38) comprises an organic polymeric material including a strengthening material therein.

11. A vehicle body (20) as set forth in claim 1 wherein said shells (36, 38) present open edges (40) opposite to said distal edge (40) to define an open periphery engaging said cover (32) to close said shells (36, 38) to said cover (32).

* * * * *